United States Patent Office 2,899,364
Patented Aug. 11, 1959

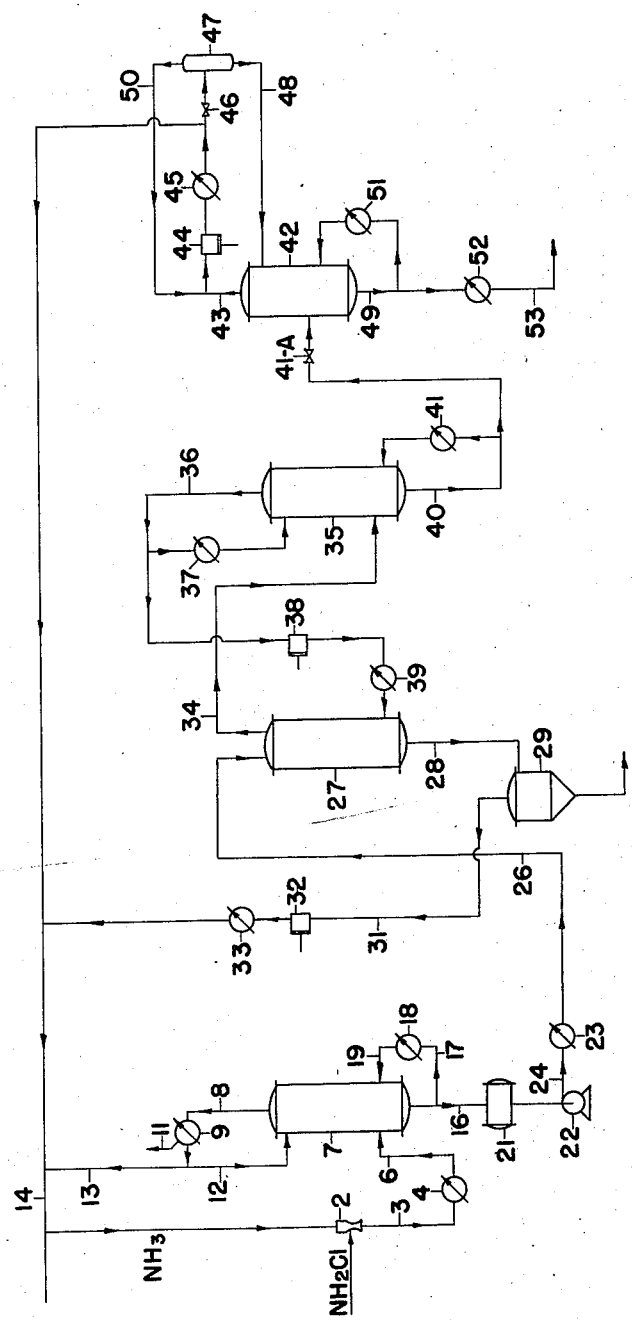

2,899,364

METHOD OF RECOVERING HYDRAZINE

Harry H. Sisler, Columbus, Ohio, and Forrest R. Hurley, Glen Burnie, Md., assignors to The Ohio State University Research Foundation, Columbus, Ohio Application August 30, 1955, Serial No. 531,470

8 Claims. (Cl. 202—50)

This invention relates to the recovery of hydrazine and, more specifically, to the recovery of anhydrous hydrazine from mixtures containing hydrazine, ammonia and a halogen in a combined form.

In the production of hydrazine by the Sisler and Mattair process as described in U.S. Patent No. 2,710,248, issued June 7, 1955, a gaseous chlorine is brought into contact with excess gaseous ammonia to yield a mixture containing chloramine, which is then reacted with liquid ammonia to yield a liquid mixture of hydrazine, ammonia, and ammonium chloride.

Anhydrous hydrazine cannot be recovered from this final mixture by simple distillation because ammonia is displaced from ammonium chloride by the less volatile base hydrazine and the desired hydrazine remains behind as the hydrochloride salt. Since the hydrazine reaction yields at least an equivalent quantity of ammonium chloride, the amount of ammonium chloride is always sufficient to convert the hydrazine completely to hydrazine hydrochloride, and no hydrazine is recovered.

One method of avoiding this difficulty involves addition of a higher boiling amine to the mixture and distillation of the hydrazine therefrom. However, an amount of amine equivalent to the chloride present remains as the amine hydrochloride and must be recovered, since the economics of the process do not permit discarding it.

Another method involves the addition of metallic sodium to convert the ammonium chloride to sodium chloride, ammonia, and hydrogen. Most of the sodium chloride can be removed by filtration, but in any case, it is inert toward hydrazine.

In accordance with the present invention, we have discovered a method whereby hydrazine can be distilled from such mixtures. This method depends upon the fact that even though ammonia is much more volatile than hydrazine, there is, at elevated temperatures, an appreciable vapor pressure of hydrazine in equilibrium with the liquid ammonia solution of hydrazine and ammonium chloride. Thus, if the vapor in equilibrium with this solution is swept out of the system and is replaced by pure liquid ammonia, the system is eventually stripped of hydrazine. Ammonia and the ammonium chloride remain as a distillation residue.

The present invention is in some degree an exploitation of the fact that at elevated temperatures and pressures the mole ratio of $N_2H_4/NH_3$ in the equilibrium vapor mixture is higher than at lower temperatures. Thus, in a closed vessel containing an anhydrous mixture of ammonia, ammonium chloride, and hydrazine, an increase in temperature produces a considerable increase in the mole fraction of hydrazine in the ammonia-hydrazine vapor above the liquid mixture.

If the gaseous hydrazine-ammonia mixture above a liquid mixture of hydrazine, ammonia and ammonium chloride is removed and, at the same time, liquid ammonia is fed back to the system to replenish the supply of ammonia in the liquid phase, it is possible to remove all of the hydrazine from the liquid. Separation of hydrazine from ammonia can be accomplished by simple distillation.

The relation between the vapor pressure of a solute over a solution and the concentration of the solute in the solution at a given temperature is given by Henry's law, which may be stated mathematically as follows:

$$p_{N_2H_4} = n_{N_2H_4} K$$

where $p_{N_2H_4}$ is the partial pressure of hydrazine in equilibrium with the solution, $n_{N_2H_4}$ is the mole fraction of hydrazine in the solution and K is a constant. As the temperature of the liquid hydrazine-ammonia-ammonium chloride system is raised, the value of K in the above equation increases. From a large number of runs, we have determined that the "K" value of Henry's law at temperatures between 0 and 120° C. for the ammonia-hydrazine-ammonium chloride system (in the range of 10 to 40 mole percent of ammonium chloride) is expressed by the following equation:

$$\log K = 0.816 - \frac{973}{T^\circ C. + 230}$$

The present invention is further explained in connection with the accompanying drawing, which is a flow sheet showing an operable process embodying the present invention. In this process, the product stream from hydrazine reactor 2, containing hydrazine, ammonium chloride, and small amounts of nitrogen dissolved in a large amount of liquid ammonia is passed through a line 3 to a heater 4, where it is brought to the temperature for the initial separation. The heated products are passed through line 6 into an ammonia fractionator 7 from which excess ammonia and dissolved nitrogen are removed overhead through a line 8 into a condenser 9. Nitrogen is removed from the system through a vent 11 and the ammonia is split into a reflux stream 12, which is returned to an upper portion of ammonia fractionator 7 and a recycle stream 13, which joins ammonia collecting line 14 for return to the hydrazine reactor 2 or to storage, as desired.

As was pointed out above, increasing the temperature of hydrazine-ammonia-ammonium chloride mixtures produces an increase in the concentration of hydrazine in the vapors overhead. Since ammonia removal is the object, this step is carried out at a relatively low temperature and at pressures within the range of about 120 to 200 p.s.i.a. This depresses the vaporization of hydrazine.

Sufficient ammonia is removed from the product stream to reduce the concentration to the point that it will be substantially saturated by the ammonium chloride present. This gives a much higher concentration of hydrazine in the stream leaving fractionator 7.

If needed, heat may be added to fractionator 7 by withdrawing from effluent stream 16 a side stream 17 into a reboiler 18 and returning the heated material through line 19 to a lower portion of ammonia fractionator 7. The remainder of the product from ammonia fractionator 7 is passed into a surge tank 21 and is transferred therefrom by means of pump 22 through a heater 23 via lines 24 and 26 into the top of extraction column 27. A suitable type of such apparatus is a conventional bubble cap tower.

The hydrazine-ammonium chloride-ammonia mixture passes downward through extraction column 27 and meets an upflowing current of gaseous ammonia. The downwardly flowing liquid is depleted of its hydrazine so that it is possible to remove a bottom mixture comprising liquid ammonia substantially saturated with ammonium chloride and free of hydrazine.

The bottom stream 28 is passed into a flash still 29. Solid ammonium chloride is removed below and a gaseous ammonia stream 31 is removed from the top and passed through a compressor 32 into a condenser 33 and thence into ammonia collecting line 14 for return to the hydrazine reactor 2 or to storage, as desired.

A hydrazine-ammonia gas stream 34 is removed overhead from extraction column 27 and is passed into a lower portion of hydrazine fractionator 35 which may be of conventional design wherein an upflowing gas contacts a downflowing liquid containing a high-boiling component, which collects at the bottom. A bubble cap tower is suitable for this purpose.

A gaseous stream of ammonia 36 is removed overhead. Part of it is returned through a reflux condenser 37 to fractionator 35. The remainder is passed through a compressor 38 and a heater 39 into the lower portion of extraction column 27 for extraction of the hydrazine from the hydrazine-ammonium chloride-ammonia mixture as explained above.

A hydrazine product stream 40 containing a small amount of ammonia is removed from the bottom of hydrazine fractionator 35. A portion of stream 40 may be recirculated through reboiler 41 to fractionator 35. The remaining portion is passed through expansion valve 41A into a finishing still 42 where a flash evaporation of ammonia takes place. The vaporized ammonia stream 43 is removed overhead and is passed through compressor 44 and condenser 45. A portion of the condensed stream is returned through ammonia collecting line 14 to the hydrazine reactor or to storage, as desired. A second portion of the condensed stream passes through expansion valve 46 into a separator 47 from which a liquid ammonia stream 48 passes from the bottom to an upper portion of finishing still 42. An overhead stream 50 from separator 47 is recycled to the compressor 44.

A portion of raffinate stream 49 from finishing still 42 is recycled through reboiler 51 into a lower portion of finishing still 42. The remainder portion of stream 49, which comprises substantially pure anhydrous liquid hydrazine is passed through product cooler 52 through line 53 into hydrazine storage not shown.

The product stream from the Sisler and Mattair hydrazine process normally will comprise a mixture of ammonia, hydrazine, and ammonium chloride in which the hydrazine concentration is of the order of 1 mole percent, the ammonium chloride concentration is of the order of 2 mole percent, and the remainder is ammonia. The exact composition will vary, depending upon the yield from the process, which in turn depends upon the ratio of ammonia to chloramine employed as well as other factors. In all cases, the concentration of ammonia will be relatively high. Before this mixture is passed into the hydrazine extraction column, it is necessary to reduce the ammonia content to avoid handling large quantities of material and to give a mixture having as high a content of hydrazine as possible in order to give a high hydrazine vapor pressure.

Since the concentration of hydrazine vapor in equilibrium with the liquid mixture is relatively low at low temperatures, it is good practice to carry out the initial ammonia removal step at a relatively low temperature. The concentration is usually not carried to the point that crystallization begins because we would prefer not to handle an ammonium chloride slurry in the system. The ammonia removal step is carried out at temperatures in the range of 25° C. to 80° C. and pressures of 120–200 p.s.i. Precautions are usually taken to insure that the solution does not become saturated with ammonium chloride until the ammonia-ammonium chloride separation step.

The concentrated ammonia-hydrazine-ammonium chloride mixture is passed into the top of an extraction column under such pressure that liquid ammonia is always present. This maintains the ammonium chloride in solution and flushes the material out the bottom of the extractor. Gaseous ammonia is introduced into a lower portion of this extractor and, as it passes upwardly therethrough, it becomes enriched with hydrazine from the downwardly flowing liquid stream. The composition of the gaseous overhead stream will be of the order of 0.25 mole percent hydrazine or less. We have found that it is necessary to supply gaseous ammonia to this column in amounts of 400–1000 moles of ammonia per mole of hydrazine to be removed. Below about 400 moles of ammonia per mole of hydrazine, extraction is incomplete. The upper limit is determined by practical considerations.

Because of the favorable change with increasing temperature, in the mole ratio $N_2H_4/NH_3$ in the equilibrium vapor, it is desirable to operate the hydrazine extraction step at relatively high temperatures. By this, we mean temperatures in the range of about 80 to 130° C. Above 130° C., hydrazine begins to decompose and there is danger of explosions as well as loss of hydrazine. The pressure on such a system will be determined by the temperature employed but will normally be of the order of 300–500 pounds per sq. in. It must be sufficient to maintain a liquid phase in the system.

Since ammonia boils at −33° C. and hydrazine at 113° C., the hydrazine-ammonia mixture can be separated by fractional distillation. In the foregoing detailed description we have shown this as being accomplished in two separate steps. This method is employed since it is desired to add ammonia continuously to the hydrazine extraction step and to maintain a uniform recycle of ammonia from the hydrazine fractionator to the hydrazine extractor. This necessitates removal of some ammonia from the hydrazine fractionator. A constant volume of gaseous ammonia is removed from the fractionator and is recycled to the hydrazine extractor. These two vessels are maintained at about the same pressure and temperature. The ammonia is circulated by means of a suitable pump or blower in the line between the top of the hydrazine distillation column and the bottom of the hydrazine extraction column.

The present invention is particularly adapted to the recovery of anhydrous hydrazine from the products of the Sisler and Mattair process referred to above. In this process, gaseous ammonia and gaseous chlorine are brought together in a first stage to form gaseous chloramine and ammonium chloride in an excess of gaseous ammonia. The ammonium chloride is filtered from the gas stream and the chloramine-ammonia stream is brought into contact with liquid ammonia, where chloramine reacts with ammonia to form hydrazine and an equimolar quantity of ammonium chloride. Since the hydrazine-destroying reaction yields nitrogen and ammonium chloride, there will always be present at least a small amount of nitrogen dissolved in an excess of liquid ammonia and the total ammonium chloride will always be more than the molar equivalent of hydrazine. Therefore, the composition of the product stream from this type of reaction will vary according to the amount of excess ammonia used in the system and the efficiency of the process. Ammonia to chloramine ratios of the order of 50:1 to 800:1 are contemplated although a ratio of 100:1 is probably average. A typical product stream would contain about 1 mole percent of hydrazine, 2 mole percent of ammonium chloride and smaller amounts of nitrogen dissolved in anhydrous liquid ammonia.

The present process has been described herein as particularly applied in separating the resulting product stream from a Sisler and Mattair process into its components. However, it is to be understood that the present process is applicable to the separation of hydrazine from its hydrohalides, mixtures of hydrazine in ammonium chloride, and from mixtures of hydrazine and the halogen salts of other anions which are displaced by hydrazine but which do not otherwise react with the components of the mixture.

It is to be understood, also, that the present process is also applicable to batch operation. In such operation, the hydrazine-ammonium chloride-ammonia mixture is placed in a closed container and provision is made for recycling ammonia into the system. The vessel is heated to the predetermined temperature and the gaseous mixture above the liquid is valved off and separated. Sufficient ammonia is returned to the system to maintain the volume constant. This is continued until all of the hydrazine has been removed from the system. The hydrazine is separated from ammonia by fractional distillation as described in the continuous process.

The present invention will be further illustrated by the following illustrative but non-limiting examples which have been chosen from a large number of test runs performed to illustrate and establish the feasibility of the present invention but not with limiting intent.

Example I

A solution of 0.142 mole of hydrazine and 0.284 mole of ammonium chloride in 1000 moles of liquid ammonia was prepared by dissolving 0.142 mole of hydrazine dihydrochloride in 1000 moles of liquid ammonia. This solution was heated to 100° C. in an autoclave and the vapor was rapidly valved off and condensed in a trap at −75° C. The ammonia was allowed to evaporate from the trap and the residue was analyzed for hydrazine and chloride by standard methods. No chloride was found but 4% of the hydrazine originally added was found. The residue in the autoclave was analyzed for hydrazine. The recovery of hydrazine was virtually quantitative.

A similar run was carried out at 130° C. Tests on the recovered liquid showed that about 12.5% of the original hydrazine had been distilled over without any trace of chloride. The material balance showed virtually complete recovery of hydrazine.

It should be noted that in these runs, no additional ammonia was pumped into the system such as would be done in a continuous process as described in the following example.

Example II

In order to test the operability of the present invention in a continuous system, a synthetic mix was prepared having a composition of 0.2 mole fraction hydrazine, 0.4 mole fraction ammonium chloride, and 0.4 mole fraction ammonia. A Jerguson gauge with heavy Pyrex windows was set up as a hydrazine extraction unit. A small glass tube was inserted into a lower portion of the gauge to permit the introduction of gaseous ammonia into the liquid within the apparatus. Overhead, a line was inserted for removal of vapors from the vessel to a system of closed cooled traps. The Jerguson apparatus and accompanying lines were immersed in a thermostated bath. The hydrazine-ammonia-ammonium chloride mixture was placed in the apparatus in such an amount that at the operating temperature a considerable volume of liquid phase is present. Ammonia gas was introduced into the system by a vapor pressure from a carefully heated pressure vessel. The flow rate of ammonia into the apparatus was controlled by visual observation of the bubbles forming in the solution while the rate of flow of vapor out of the system overhead was controlled by maintaining the desired pressure and volume of liquid within the apparatus.

The system pressure, equal to the partial pressure of the ammonia (33 atmospheres or 485 p.s.i.) was initially set by condensing enough ammonia in the tube to bring the hydrazine, ammonium chloride and ammonia system to the desired operating volume.

Ammonium chloride was added to the cold traps to react with the hydrazine when the excess ammonia was evaporated. After ammonia evaporation, the residue was acidified with dilute sulfuric acid and analyzed for hydrazine by the acid-iodate method.

In the first run, over 96% of the total hydrazine was removed from the apparatus by use of 1000 moles of ammonia per mole of hydrazine at 110° C. A material balance was run and it was ascertained that over 95% of the hydrazine was recovered and no chloride was lost from the apparatus.

Such a system as described above is comparable to a single plate stripping apparatus. A multiple plate apparatus would be still more efficient.

We claim:
1. In the production of hydrazine by the reaction of chloramine with liquid ammonia under anhydrous conditions wherein there is obtained a product mixture consisting essentially of hydrazine and ammonium chloride dissolved in liquid ammonia, the method of recovering anhydrous hydrazine therefrom comprising continuously distilling from said product at an elevated temperature not above 130° C. the equilibrium vapors of hydrazine and ammonia, continuously removing said vapors from contact with the remaining liquid, fractionating said vapors into hydrazine and ammonia, and continuously returning ammonia to said product mixture to maintain the ammonium chloride in solution and to replace the ammonia removed by distillation.

2. The method of recovering anhydrous hydrazine from anhydrous mixtures of hydrazine and a hydrohalide salt of a base which is displaced therefrom by hydrazine comprising the steps of providing an anhydrous liquid solution of hydrazine and said hydrohalide salt in ammonia, heating said liquid to vaporize the volatile constituents thereof, adding ammonia to said liquid solution at a rate and in sufficient quantity to maintain said salt in solution, withdrawing the vaporized constituents from contact with said solution and cooling said withdrawn constituents to separate anhydrous hydrazine therefrom.

3. In the production of hydrazine by the reaction of chloramine with anhydrous liquid ammonia wherein the product comprises hydrazine and ammonium chloride dissolved in a relatively large quantity of anhydrous liquid ammonia, the method of recovering anhydrous hydrazine therefrom comprising distilling therefrom a large portion of the liquid ammonia to yield a concentrated homogeneous ammoniacal solution of hydrazine and ammonium chloride, heating said concentrated mixture to distill ammonia and hydrazine therefrom at a temperature not above 130° C., continuously removing the equilibrium vapors in contact with said concentrated mixture, fractionating said equilibrium vapors into ammonia and hydrazine, and continuously returning ammonia to said concentrated mixture at a rate sufficient to maintain the ammonium chloride in solution.

4. The method of recovering anhydrous hydrazine from a solution of hydrazine and ammonium chloride in liquid ammonia comprising the steps of continuously injecting into an upper portion of an upright elongated extraction zone for downward flow therethrough a stream of said solution, maintaining said zone at a temperature of about 80° C.–130° C. and a pressure sufficient to maintain sufficient liquid phase therein to retain the ammonium chloride in solution, continuously removing from an upper portion of said extraction zone a stream of mixed hydrazine and ammonia vapors, separating said vapors into anhydrous hydrazine and ammonia, continuously recycling to a lower portion of said extraction zone for upward flow through said downflowing liquid a portion of said ammonia sufficient to retain the ammonium chloride in solution and continuously removing from a lower portion of said extraction zone a stream of ammonium chloride dissolved in liquid ammonia.

5. The method of recovering anhydrous hydrazine from anhydrous liquid mixtures of hydrazine, ammonia and ammonium chloride which comprises the steps of heating an anhydrous liquid mixture of said components to distill ammonia and hydrazine, separately recovering hydrazine from this distillate, and adding to the original mixture sufficient ammonia to maintain the ammonium chloride in solution.

6. The method of recovering anhydrous hydrazine from anhydrous liquid mixtures of hydrazine, ammonia and ammonium chloride which comprises the steps of providing a liquid mixture of said components in which the amount of ammonia is at least sufficient to maintain the ammonium chloride in solution at all times, heating said mixture to distill ammonia and hydrazine, separately recovering hydrazine from the distillate and adding back to said mixture sufficient ammonia to replace that removed by distillation and retain the ammonium chloride in solution.

7. In the production of hydrazine by the reaction of anhydrous ammonia with anhydrous chlorine wherein hydrazine, ammonia and ammonium chloride are obtained as a liquid product mixture, the method of recovering anhydrous hydrazine therefrom, comprising the steps of heating said liquid product mixture to a temperature between the boiling point of ammonia and about 80° C. to reduce the ammonia content below that of the product mixture but not sufficiently low to saturate the mixture with ammonium chloride, heating said mixture to distill hydrazine and ammonia, separately recovering hydrazine from the distillate and returning to the liquid product mixture ammonia in sufficient quantities to maintain the ammonium chloride in solution and to replace the ammonia removed by distillation.

8. The method of recovering anhydrous hydrazine from anhydrous liquid mixtures of hydrazine and ammonium chloride in solution in liquid ammonia comprising the steps of heating said liquid mixture to a temperature of about 80–130° C. to distill hydrazine and ammonia therefrom, separately fractionating the distillate to recover hydrazine and returning ammonia to the original liquid mixture in amounts sufficient to maintain the ammonium chloride in solution and to replace the ammonia removed by distillation.

References Cited in the file of this patent

UNITED STATES PATENTS

| | | |
|---|---|---|
| 2,675,299 | Haller | Apr. 13, 1954 |
| 2,675,300 | Haller | Apr. 13, 1954 |
| 2,710,248 | Sisler | June 7, 1955 |
| 2,735,752 | Neth | Feb. 21, 1956 |